B. M. GRAYBILL.
ELECTRIC WIRING FIXTURE.
APPLICATION FILED MAY 26, 1915.
1,206,431.
Patented Nov. 28, 1916.
2 SHEETS—SHEET 1.
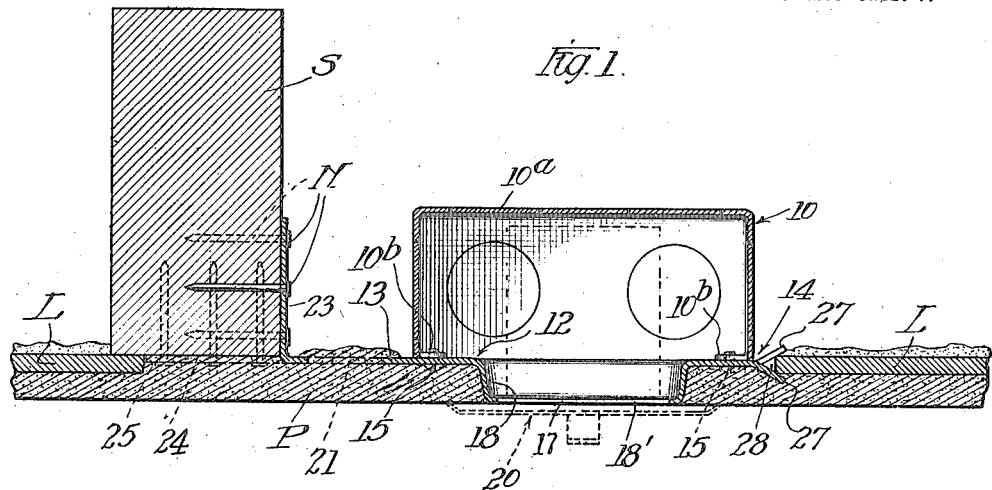
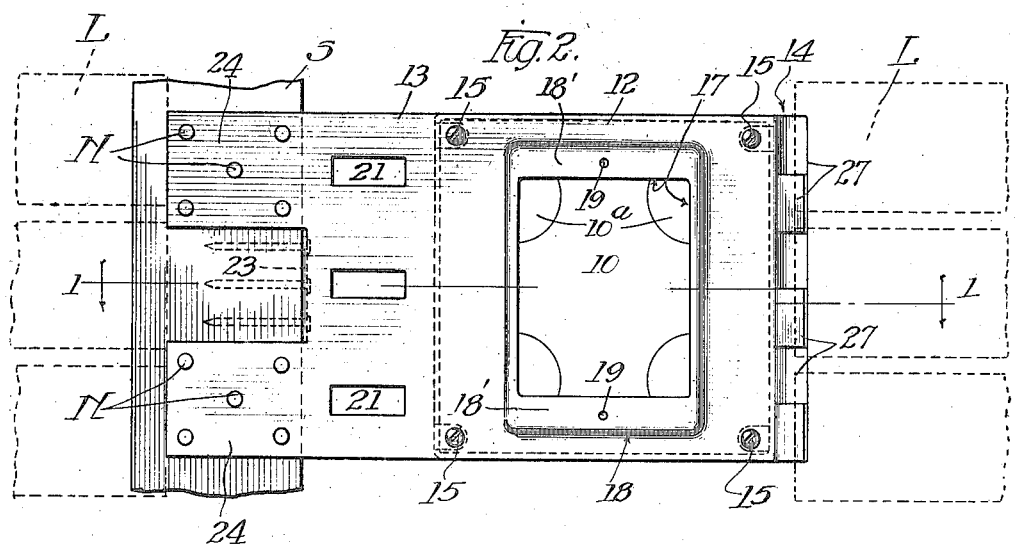
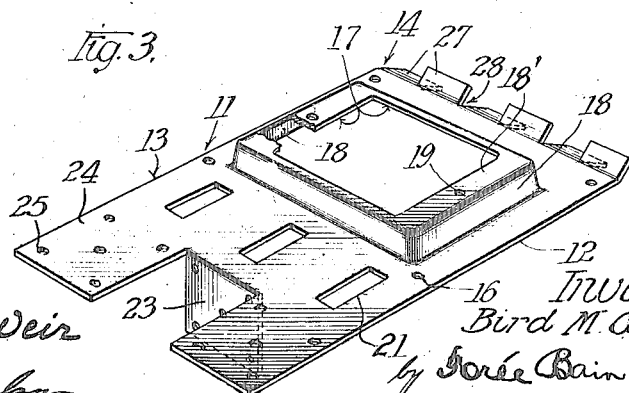
Witnesses:
Robert H. Weir
Arthur W. Carlson
Inventor
Bird M. Graybill
by Forée Bain & May
Attys.

B. M. GRAYBILL.
ELECTRIC WIRING FIXTURE.
APPLICATION FILED MAY 26, 1915.
1,206,431.
Patented Nov. 28, 1916.
2 SHEETS—SHEET 2.
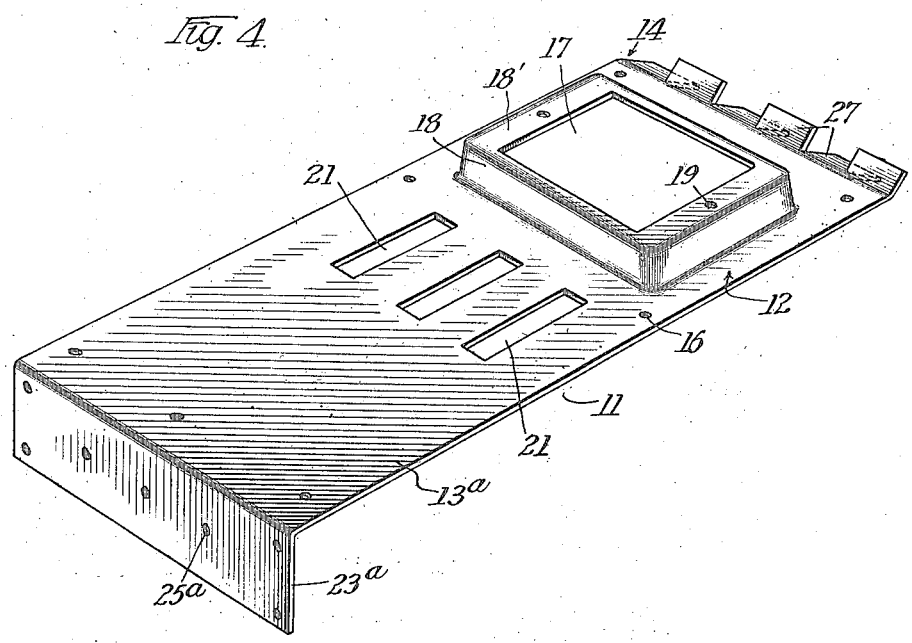
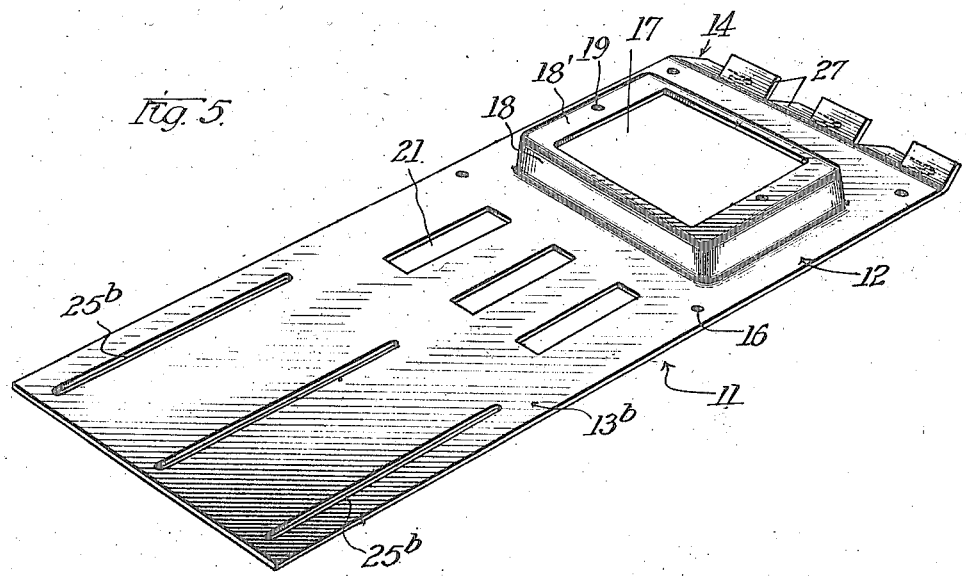

UNITED STATES PATENT OFFICE.

BIRD MALVIN GRAYBILL, OF CHICAGO, ILLINOIS, ASSIGNOR TO ECONOMY ELECTRICAL SPECIALTY COMPANY, OF CHICAGO, ILLINOIS, A CORPORATION OF ILLINOIS.

ELECTRIC-WIRING FIXTURE.

1,206,431.  Specification of Letters Patent.  Patented Nov. 28, 1916.

Application filed May 26, 1915. Serial No. 30,504.

*To all whom it may concern:*

Be it known that I, BIRD MALVIN GRAYBILL, a citizen of the United States, residing at Chicago, in the county of Cook and State of Illinois, have invented certain new and useful Improvements in Electric-Wiring Fixtures, of which the following is a specification.

My invention relates to electrical wiring fixtures, and more particularly to means for supporting and positioning outlet boxes and covers in building construction.

One of the principal objects of my invention is to provide means to facilitate the cheap and easy installation of outlet boxes, minimizing both the materials and the labor costs of installation.

Another object is to provide for embodiment of my invention a structure that may be easily and cheaply manufactured, that meets with all requirements of fire protection in the installation of electric wiring; that gives greatest facility in handling in erection; and that affords most effective coöperation of the outlet box and support with the customary structural members of the building.

In the drawings wherein I have illustrated means for embodiment of my invention, Figure 1 is a horizontal sectional view through a completed structure erected in accordance with my invention; Fig. 2 is a face view of the parts below the plaster line in process of erection; Fig. 3 is a perspective view of a combined cover and support for an outlet box; Figs. 4 and 5 are similar views of slightly modified forms of construction.

In the drawing 10 indicates in general an outlet box member, and 12 a cover plate member therefor, one of these coöperating members having a side wing extension 13 for connection with a support, and one of said members preferably having, oppositely to the first mentioned wing, a shorter side wing structure 14 for coöperation with that portion of the lathing that is interrupted by the placing of the outlet box structure in the building wall. In the specific construction shown, the outlet box 10 is schematically represented as an ordinary "knock out" box, closed at its four sides and back by walls having suitably placed "knock outs" $10^a$ and having at its open front face appropriate attaching ears $10^b$, to receive screws 15 that extend through suitable apertures 16 made in the cover plate 12. The cover plate portion 12, preferably of a width to correspond with the height of the box, has a front opening 17 giving access to the interior of the box, and this opening is bordered by a rim 18. Said rim 18 has its mouth sufficiently elevated to lie flush with the plaster in the finished construction, and preferably has inturned lips $18'$ at its edges, these lips being apertured, as at 19, for connection with such electrical appliance as the box is intended to house.

In Fig. 1, 20, in dotted lines, represents a usual finishing plate or switch plate, carrying an electric switch and adapted to be secured to apertures 19, this construction being shown merely for illustrative purposes as the switch and plate themselves form no part of my invention.

Obviously the size and shape of the cover-opening and details of its construction will be varied to suit different particular requirements.

Preferably the supporting wing 13 and cover 12 are made integral, the combined support and cover plate being indicated as an entirety by the numeral 11. At or adjacent its ends the plate 13 is provided with means for attachment to a suitable support, such as the upright studding S, and in the area between the intended point of support and the cover portion 12 are provided apertures 21 through which the plaster, indicated in Fig. 1, as P, may key.

In specific construction the supported extremity of wing 13 may be varied in form, but for general purposes it is my preference that the extremity of the plate be slit lengthwise into ears, and that one ear 23 to act as a gage and brace be turned back at right angles to the plane of the plate, in position interposed between the planar attaching ears 24. Each of these ears may have any suitable number of apertures 25 for reception of screws or nails, indicated at N in Fig. 1. For some structural purposes, however, it may be preferable to bend the entire edge portion of supporting wing $13^a$ down into an angle brace $23^a$, as shown in Fig. 4, apertures $25^a$ being provided in both the brace flange and body portion of the wing $13^a$; or, as shown in Fig. 5, the supporting wing portion of the structure may be left in a single plane, the attachable extremity being provided with elongated slots 25ᵇ so that reasonable adjustment of the distance the outlet box will stand away from the point of support may be made.

The extremity 14 of the plate I preferably divide by longitudinal slits into a series of tongues 27 that are oppositely deflected to form therebetween a V-shaped groove 28 in which the extremities of the short-cut laths L may be seated, thus intimately to unite the box support and the lathing, for mutual stability in positioning.

While I have herein described in some detail for purposes of full disclosure specific constructions for embodiment of my invention, it will be understood by those skilled in the art that many changes in detail might be made in the structures without departure from the spirit of my invention, and within the scope of the appended claims.

Having described my invention, what I claim is:

1. The combination with an outlet box, of a one piece combination cover and support therefor comprising three portions, one portion constituting a support and cover for the box and adapted to overlie the open front thereof, said portion having an opening therein to permit access to the interior of the box, another portion extending beyond one side of the box and having lath engaging projections thereon, and the third portion extending beyond the opposite side of the box in the plane of the first portion and having apertures therein to receive attaching instrumentalities.

2. A combined support and cover for outlet boxes comprising a sheet metal plate, having one end adapted to be secured to a suitable support, and having a portion adjacent its other end adapted to receive an outlet box, and having in the last said portion a rimmed opening, said plate having, between said rimmed opening and the first mentioned portion, apertures through which plaster may key.

3. The combination of an outlet box member and a cover member therefor provided with a lateral extension integral therewith and constructed, adjacent its extremity, for connection to a support, and one of said members having, laterally opposite to said extension, a wing integral therewith and providing a lath-receiving channel at its edge.

4. A combined cover and support for an outlet box, comprising a cover portion provided with a rimmed opening and with apertures to receive box attaching means, a lateral extension beyond one side of said cover portion, divided into ears, one of said ears being bent backwardly to form a gage and brace, and said ears having apertures therein to receive attaching means.

5. The combination of an outlet box member and a cover member therefor, one of said members having a lateral extension connected therewith and divided into ears, one of said ears bent backward to form a gage and brace, and said ears adapted to receive attaching means.

6. A combined support and cover for outlet boxes comprising a rectangular sheet metal plate, having one end divided into ears, one of which is bent backward at right angles to the others to form a gage and brace, said ears being perforated to receive attaching means, said plate having a portion adjacent its other end adapted to receive an outlet box, and having in the said portion an opening communicating with the interior of the box, and means formed on the last mentioned plate end to provide a lath engaging channel, said plate having plaster receiving apertures between the opening and first mentioned end.

In testimony whereof I hereunto set my hand in the presence of two subscribing witnesses.

BIRD MALVIN GRAYBILL.

In the presence of—
    STANLEY W. COOK,
    MARY Y. ALLEN.